June 6, 1967 W. FROEDE ETAL 3,323,712
ROTARY INTERNAL COMBUSTION ENGINE
Filed Dec. 9, 1966 2 Sheets-Sheet 2
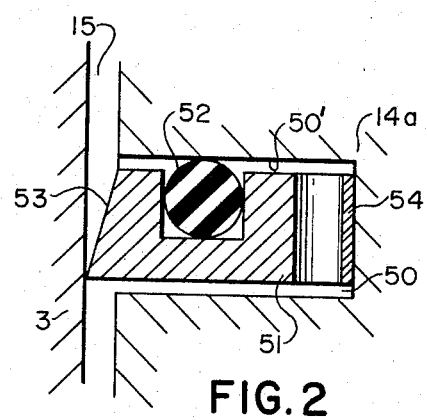
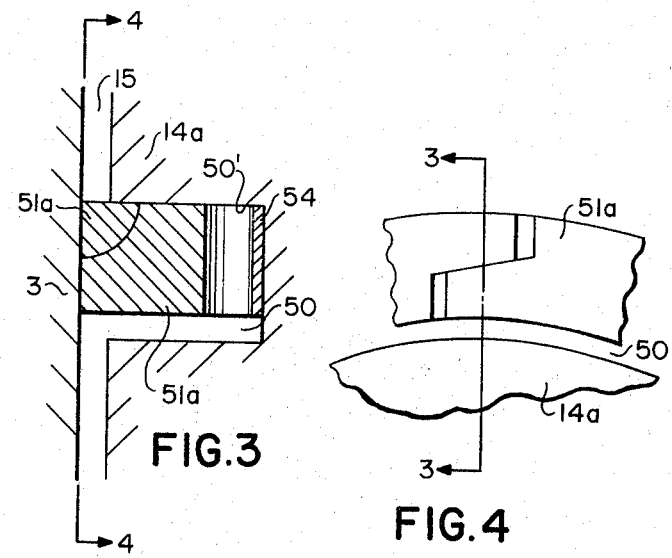
INVENTORS
WALTER FROEDE
HANS-GEORG WENDEROTH
BY Raymond P. Wallace
AGENT

United States Patent Office 3,323,712
Patented June 6, 1967

3,323,712
ROTARY INTERNAL COMBUSTION ENGINE
Walter Froede and Hans-Georg Wenderoth, both of Neckarsulm, Germany, assignors to NSU Motorenwerke Aktiengesellschaft, Neckarsulm, and Wankel G.m.b.H., Lindau (Bodensee), Germany
Filed Dec. 9, 1966, Ser. No. 600,546
Claims priority, application Germany, Dec. 11, 1965,
M 27,756
3 Claims. (Cl. 230—145)

ABSTRACT OF THE DISCLOSURE

A rotary engine of the trochoidal type, having a fluid-cooled rotor, with provision for sealing against leakage of internal rotor coolant into the working chambers during both operating and standstill conditions.

Cross-reference to related application

The present invention is an improvement on the invention disclosed in a copending application of the same inventors, Sealing Arrangement for Rotary Mechanisms, Ser. No. 500,688, filed Oct. 22, 1965.

Background of the invention

This invention relates to rotary internal combustion engines of the trochoidal type, and more particularly to a method and means for preventing leakage of rotor coolant into the working chambers of the engine during shutdown periods.

Engines of the trichoidal type are well known, and are exemplified, for instance, in Patent No. 3,249,094, and in the application referred to above. Such engines may have rotor cooled by oil or other fluid passing internally therethrough, and in such cases there is a considerable problem of sealing against leakage of the coolant into the working chambers of the engine. In application Ser. No. 500,688 such sealing has been satisfactorily achieved during operation, but since the sealing system is in part dependent on operating conditions, during shutdown some coolant may leak into the working chambers. This may make the engine hard to start, and in any case results in loss of coolant. The present invention provides an additional sealing means which operates positively during shutdown to keep coolant from leaking into the working chambers, but which during operation is responsive to the pressure conditions which are required for the memainder of the sealing system.

Summary

In application Ser. No. 500,688 there is disclosed an internal combustion engine of trochoidal type, having a peripheral shell and a pair of parallel end walls, and an oil-cooled internal rotor, providing a plurality of working chambers which vary in volume in relative rotation. The rotor and shaft are provided at appropriate locations with a plurality of annular grooves, in which are installed seal rings which coact radially with other surfaces, and axially with the groove walls by being pressed against the groove walls by gas pressure from the working chambers, which bleeds past the gas seals disposed around the rotor periphery on each end face.

When an engine of this design is shut down, pressure no longer exists between the rotor end faces and the end walls, so that the seal rings no longer are pressed against their groove walls, and oil may leak past them into an annular space between the rotor and end walls, and thence into the working chambers. The present invention solves this problem by providing, radially inward from the gas seals, a further annular groove in each end face of the rotor, in which is positioned an additional seal ring which is spring-pressed against the end wall. This ring is so designed that during operation gas pressure bleeding past the gas seals will lift it off its sealing surfaces and allow pressure through to hold to other sealing rings tight against their groove walls, but during shutdown it will be held tight by its spring against its sealing surfaces to provide a positive seal against leakage.

It is therefore an object of this invention to provide positive sealing means against leakage of cooling fluid into the working chambers during shutdown.

It is a further object to provide a sealing element permitting gas pressure passage during operation, and oil sealing during shutdown.

Other objects and advantages will become apparent on reading the following specification in connection with the appended drawings.

Brief description of the drawings

FIG. 2 is a fragmentary enlarged representation of the zone in FIG. 1 enclosed in circle A;

FIG. 3 is a fragmentary cross-section of a modified embodiment of the sealing element, taken to line 3—3 of FIG. 4; and FIG. 4 is a fragmentary view takent on line 4—4 of FIG. 3.

Description of the preferred embodiments

Figure 1:
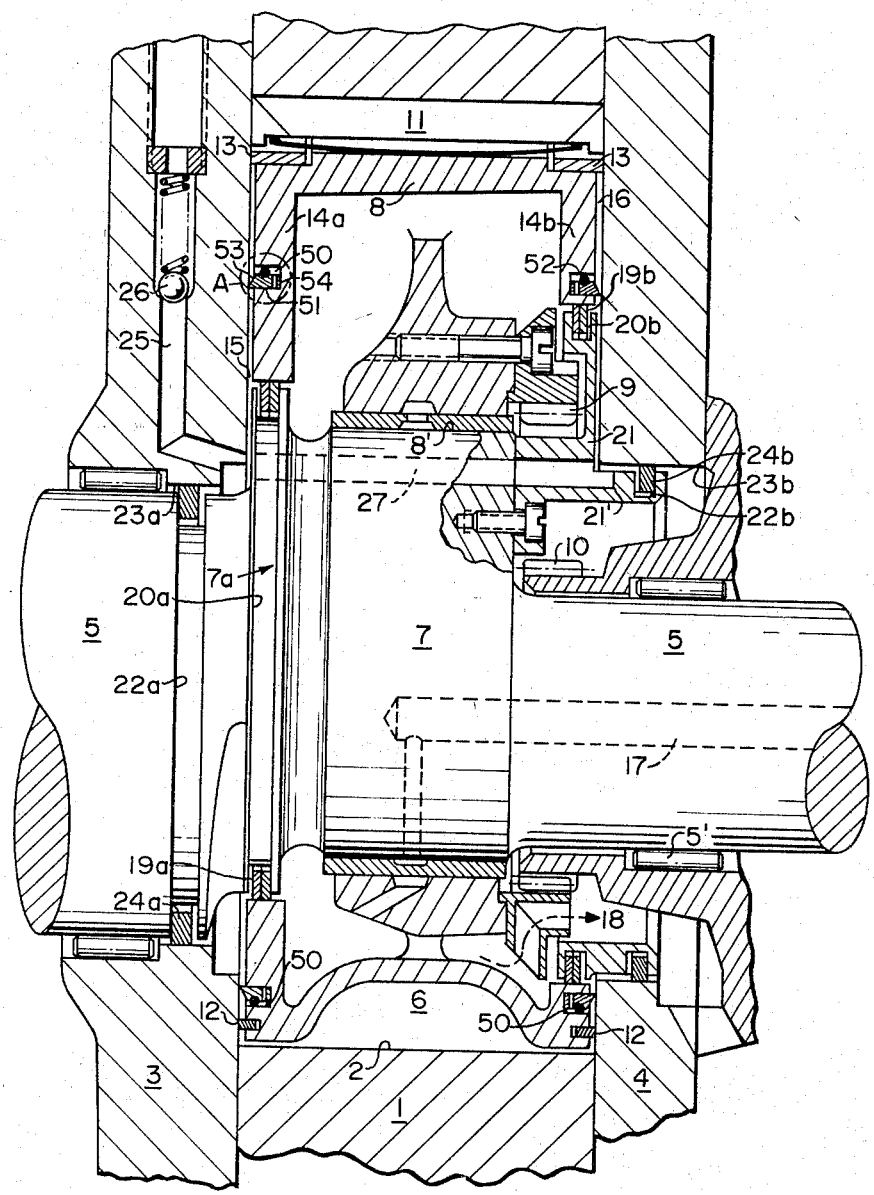
FIG. 1 shows a cross-sectional elevation of the engine in the axial plane.

FIG. 1 shows a rotary internal combustion engine of the type described, having a peripheral housing wall 1 with a two-lobed epitrochoidal inner surface 2. The remainder of the housing is formed by the two end walls 3 and 4, which are perpendicularly transpierced by the shaft 5 bearing an eccentric portion 7 disposed in the interior cavity 6 of the housing. A generally triangular rotor 8 is rotatably mounted on the eccentric on a rotor bearing 8'. Shaft bearings 5' are positioned in the end walls. The rotational speed of the shaft 5 to the rotor 8 is in a ratio of 3:1 in this example, the ratio being maintained by means of gearing comprising a ring gear 9 fixed to the rotor 8, meshing with a pinion 10 which is stationary and fixed to the end wall 4.

The rotor 8 and the peripheral wall 1 define a plurality of variable-volume working chambers corresponding in number to the number of rotor apexes, in this case three. During rotation of the rotor there takes place in each of these working chambers a four-cycle internal combustion process, there being appropriate channels (not shown) disposed in the housing for intake of fresh gas and discharge of exhaust. The individual working chambers are separated from each other by radially acting apex seals 11 disposed at each rotor apex and axially acting gas seal strips 12 disposed in the rotor end faces adjacent to the periphery and generally parallel thereto. Apex seals 11 and gas seals 12 are connected at each apex by seal pins 13 having slots in which the ends of the associated seals are seated, forming an enclosing sealing boundary for each working chamber.

Because of slight heat distortions and differential expansions of the end walls 3 and 4 and other parts, it is inevitable that a slight amount of gas leakage past the chamber sealing system will occur, into the annular spaces 15 and 16 surrounding the shaft between the end faces of the rotor and the end walls of the housing, keeping these spaces at a positive pressure.

On the other hand, it is necessary to seal these annular spaces 15 and 16 against the oil that is passed through the rotor 8 for cooling purposes, and also serves to lubricate bearings 8' and 5'. In the present case the cooling oil is introduced into the rotor through a passage 17 in the shaft and eccentric and through communicating passages in the bearings 8' to the interior of the rotor.

At the side opposite the gearing the eccentric 7 has a disk-like extension 7a, similar in form to a sleeve, having an annular groove 20a cencentric with the eccentric and the rotor. Disposed in groove 20a are a pair of split seal rings 19a with their splits out of register. The positive gas pressure in annular space 15 holds rings 19a against the axially inner wall of groove 20a, and thus the hollow interior of the rotor is sealed by rings 19a which act radially outwardly against the circumference of the bore through end face 14a of the rotor, and axially against the inner wall of groove 20a.

At the other end of the rotor, adjacent to the gearing, there is disposed a disk-like element 21 which is concentrate with the eccentric and mounted thereon, as by screws, for example. Disk 21 is provided with a peripheral annular groove 20b, in which are disposed a pair of sealing rings 19b analogous to rings 19a, sealing radially against a similar bore in end face 14b of the rotor, and axially against the inner wall of groove 20b by means of the positive gas pressure produced in the annular space 16.

The disk 21 has an aperture for passage of the shaft 5 and for the pinion 10 surrounding the shaft, which pinion is fastened to the end wall 4 and meshes with ring gear 9. This aperture or cut-out is defined by the hub portion 21' of the disk, which hub extends into bore 23b in end wall 4. Hub 21' is also provided with an annular groove 22b, in which is disposed the expansion ring 24b, which seals radially against the bore 23b, and axially against the outermost wall of its groove 22b. Ring 24b is held in its axial sealing relation by the positive gas pressure existing in the annular space 16, preventing entry thereinto of cooling oil being discharged from the rotor through the aperture in hub 21' and bore 23b in the end wall.

A similar shaft-sealing arrangement is provided at the side opposite the gearing. The shaft 5 passes through bore 23a in end wall 3, and has an annular groove 22a, in which is positioned another expansion ring 24a sealing against its axially outer groove wall by the gas pressure in annular space 15, and radially against bore 23a. In this case the seal ring 24a prevents oil from the adjacent shaft bearing from passing into space 15.

For sealing off the cooling oil as described, the seal rings 19a, 19b, 24a, and 24b must be pressed against their respective groove walls and radially outwardly. This is accomplished by the gas which bleeds past the gas seals 12 and pins 13 into the annular spaces 15 and 16, which gas builds up a positive pressure serving as a buffer. For the purpose of limiting this intermediate sealing pressure, there is provided a spring-loaded relief valve 26 positioned at a convenient location, such as in end wall 3 in the example shown. The relief valve communicates by passage means 25 with annular space 15, which in turn communicates with annular space 16 by passage means 27 through the eccentric 7. Thus the single relief valve can be used to vent both annular spaces, and in the example given it is loaded to limit the pressure to a maximum of approximately 0.5 atmosphere gage pressure.

Since seal rings 19a, 19b, 24a, and 24b can perform their function properly only when an intermediate sealing pressure exists, it follows that when the engine is shut down the gas pressure will cease and these rings do not seal. Therefore, cooling oil present in the rotor can drain into annular spaces 15 and 16, and from there seep past the gas seals into the working chambers. This may cause starting difficulty if a chamber entering the compression phase should be filled with oil, and in any case any oil in the working chambers will be either burned or swept out the exhaust port and lost.

For the purpose of avoiding this undesirable feature, the invention provides in each rotor end face an annular groove 50, concentric with rings 19a or 19b, but spaced radially outwardly therefrom. In this groove is positioned a continuous seal ring 51 (shown enlarged in FIG. 2), with spring means 54 in the bottom of groove 50 urging ring 51 axially outwardly against the end wall. The outer periphery of ring 51 is provided with a retainer groove in which is disposed an elastomeric ring 52 of rubber or similar material, which is in sealing contact with the radially outer wall 50' of groove 50. Ring 52 prevents any leakage of gas behind seal ring 51.

The axially outer surface 53 of seal ring 51, facing the end wall, is beveled down in the radially outward direction from its inner circumference. This provides a surface on which gas pressure can act during operation to push rings 51 axially inwardly into their grooves, allowing a positive gas pressure to build up in annular spaces 15 and 16. When the engine is shut down, spring means 54 push their respective rings into sealing contact with the end plates, preventing any oil leakage past them into working chambers.

Instead of solid rings such as 51, there may be used split, outwardly acting rings of the type shown in FIGS. 3 and 4. Rings 51a have the circumference split, with overlapping tongues to prevent leakage therethrough in the axial direction. Such split rings 51a do not have a beveled sealing face, but seal flat against the end walls. However, gas pressure acting radially inwardly on that portion of the circumference of the ring which protrudes from its groove compresses it and reduces its diameter slightly, lifting it free from the outward wall 50' of its groove. This allows gas to bleed around behind the ring into the annular space 15 or 16, thus again providing the necessary intermediate sealing pressure.

Although the invention has been described above in preferred embodiments, it will be understood by those skilled in the art that various modifications may be made without departing from the scope of the invention. It is intended to cover all such modifications in the appended claims.

We claim:

1. A rotary internal combustion engine having an outer body including a pair of spaced end walls interconnected by a peripheral wall to form a cavity, a shaft supported for rotation in bores in said outer body end walls and having an eccentric portion disposed within said cavity, a rotor supported for relative rotation on said eccentric portion and carrying apex seal means for sealing engagement with the inner surface of said peripheral wall and gas seal means in each end face thereof disposed adjacent to the outer periphery of said rotor for sealing engagement with the axially facing inner surface of an associated end wall, and a plurality of variable-volume working chambers defined between the inner surface of said peripheral wall and the outer peripheral surface of said rotor, said rotor having internal passage means for oil-cooling thereof and having a bore in each end face thereof, first seal groove means carried by said shaft concentric with said end wall bores, first oil seal ring means disposed in said first groove means for radial sealing engagement with said end wall bores and axial sealing engagement with a wall of said first groove means, second seal groove means carried by said eccentric and concentric with said rotor end face bores, second oil seal ring means disposed in said second groove means for radial sealing engagement with said rotor end face bores and axial sealing engagement with a wall of said second groove means, said first and second ring means being urged into sealing engagement with the walls of said first and second groove means during engine operation by gas pressure bypassing said gas seals and subsisting between said rotor end faces and said end walls, wherein the improvement comprises:

(a) said rotor having in each end face a third annular groove disposed radially outward from said rotor end face bore and concentric therewith and radially inward from said gas seals, (b) a third oil seal ring disposed in each of said third annular grooves for radial sealing engagement with a wall of said third annular groove and axial sealing engagement with the associated end wall, (c) spring means disposed in said third annular groove under said third oil seal ring resiliently urging said third oil seal ring in the axially outward direction toward said end wall, (d) said third oil seal ring being responsive to gas pressure bypassing said gas seals to relieve said third oil seal ring from sealing engagement during engine operation to allow said gas pressure to reach said first and second oil seal ring means to exert gas pressure thereon during engine operation whereby said first and second oil seal rings prevent leakage of rotor cooling oil into the space between said rotor end faces and said end walls and thence past said gas seals into said working chambers, and (e) during shutdown said third oil seal rings are resiliently urged by said spring means into sealing engagement with said end walls to prevent leakage of rotor cooling oil therepast.

2. The combination recited in claim 1, wherein said third oil seal ring is a continuous ring having its end wall engaging face beveled off in a direction away from the inner diameter of said third ring, and an elastomeric ring is disposed in said third annular groove surrounding said third ring and having sealing engagement with the outer circumference of said third ring and with the radially outer wall of said third groove.

3. The combination recited in claim 1, wherein said third oil seal ring is a split outwardly-acting ring having its axially outward surface in flat sealing engagement with said end wall and its outer circumference in sealing engagement with the radially outer wall of said third groove, said split ring being responsive to externally applied gas pressure to contract said split ring and relieve sealing engagement with said third groove.

References Cited

UNITED STATES PATENTS

| | | | |
|---|---|---|---|
| 1,831,263 | 11/1931 | Ross | 123—8 |
| 2,988,065 | 6/1961 | Wankel et al. | 103—130 |
| 3,102,520 | 9/1963 | Schlor | 123—8 |
| 3,179,331 | 4/1965 | Paschke et al. | 230—145 |
| 3,196,850 | 7/1965 | Jones | 123—8 |
| 3,204,614 | 9/1965 | Huber | 123—8 |
| 3,206,109 | 9/1965 | Paschke | 123—8 |
| 3,249,094 | 5/1966 | Hoppner et al. | 230—145 |
| 3,251,541 | 5/1966 | Paschke | 123—8 |
| 3,261,542 | 7/1966 | Jones | 123—8 |
| 3,269,370 | 8/1966 | Paschke et al. | 123—8 |

DONLEY J. STOCKING, *Primary Examiner*

W. J. GOODLIN, *Assistant Examiner.*